B. B. BIENHOFF.
DISPLAY APPARATUS.
APPLICATION FILED OCT. 22, 1909.

983,344.

Patented Feb. 7, 1911.
4 SHEETS—SHEET 1.

B. B. BIENHOFF.
DISPLAY APPARATUS.
APPLICATION FILED OCT. 22, 1909.

983,344.

Patented Feb. 7, 1911.

4 SHEETS—SHEET 2.

Witnesses:

Inventor:
Benjamin B. Bienhoff,
by: Attorney.

B. B. BIENHOFF.
DISPLAY APPARATUS.
APPLICATION FILED OCT. 22, 1909.

983,344.

Patented Feb. 7, 1911.

4 SHEETS—SHEET 3.

Witnesses:
H. Fischer
Jule Donovan

Inventor:
Benjamin B. Bienhoff,
by: F. W. Bradbury
Attorney.

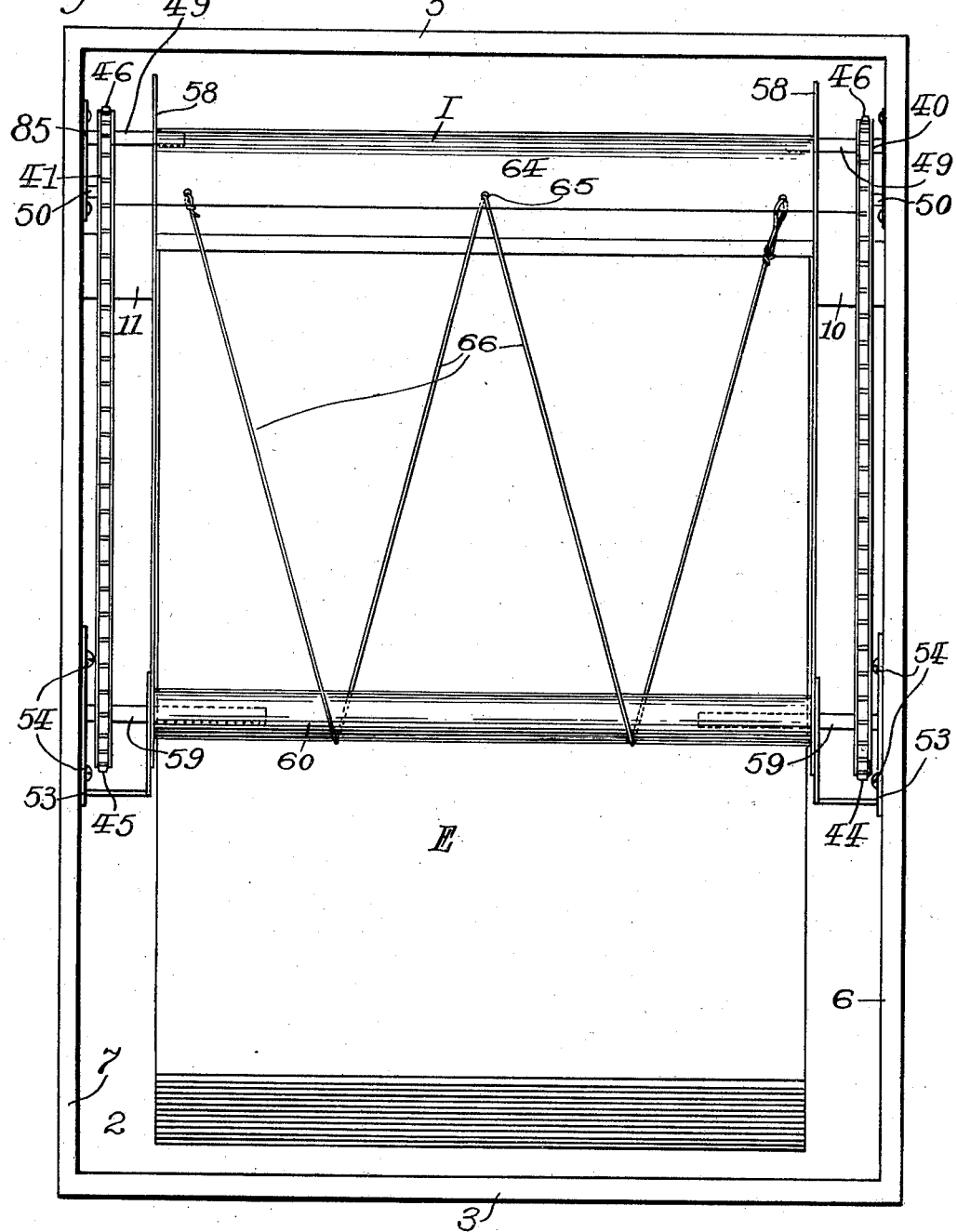

UNITED STATES PATENT OFFICE.

BENJAMIN B. BIENHOFF, OF ST. PAUL, MINNESOTA.

DISPLAY APPARATUS.

983,344. Specification of Letters Patent. Patented Feb. 7, 1911.

Application filed October 22, 1909. Serial No. 524,041.

*To all whom it may concern:*

Be it known that I, BENJAMIN B. BIEN-HOFF, a citizen of the United States, residing at St. Paul, in the county of Ramsey and State of Minnesota, have invented a new and useful Improvement in Display Apparatus, of which the following is a specification.

My invention relates to improvements in display apparatus and more particularly to apparatus of its kind which is employed for advertising purposes and for displaying goods.

This invention employs a series of flexible signs which are adapted to be turned one at a time leaving exposed to view a succeeding sign bearing an advertisement upon its surface.

My invention also contemplates displaying rugs and other objects which I consider the full equivalent of the term "signs" used in the following specification and claims.

Among the primary objects of my invention are simplicity of construction, and effectiveness of action in an apparatus which is adapted to display a maximum number of signs within a minimum space.

Among further objects is to produce a device for accomplishing the results attained which is driven by a minimum amount of power and which is entirely automatic and positive in operation. This invention without varying the driving element can be modified in operation so as to alter the period of changing the signs as desired and has among its features distinctive from prior devices the turning of each sign completely over when it is removed from the exposure aperture in the inclosing frame.

The invention further employs a plurality of coöperating carriers, one being used to first lift each sign away from the aperture and the other to which the sign is transferred from the first for turning the sign over and depositing it at the back end of a series of signs to be displayed.

Figure 1:
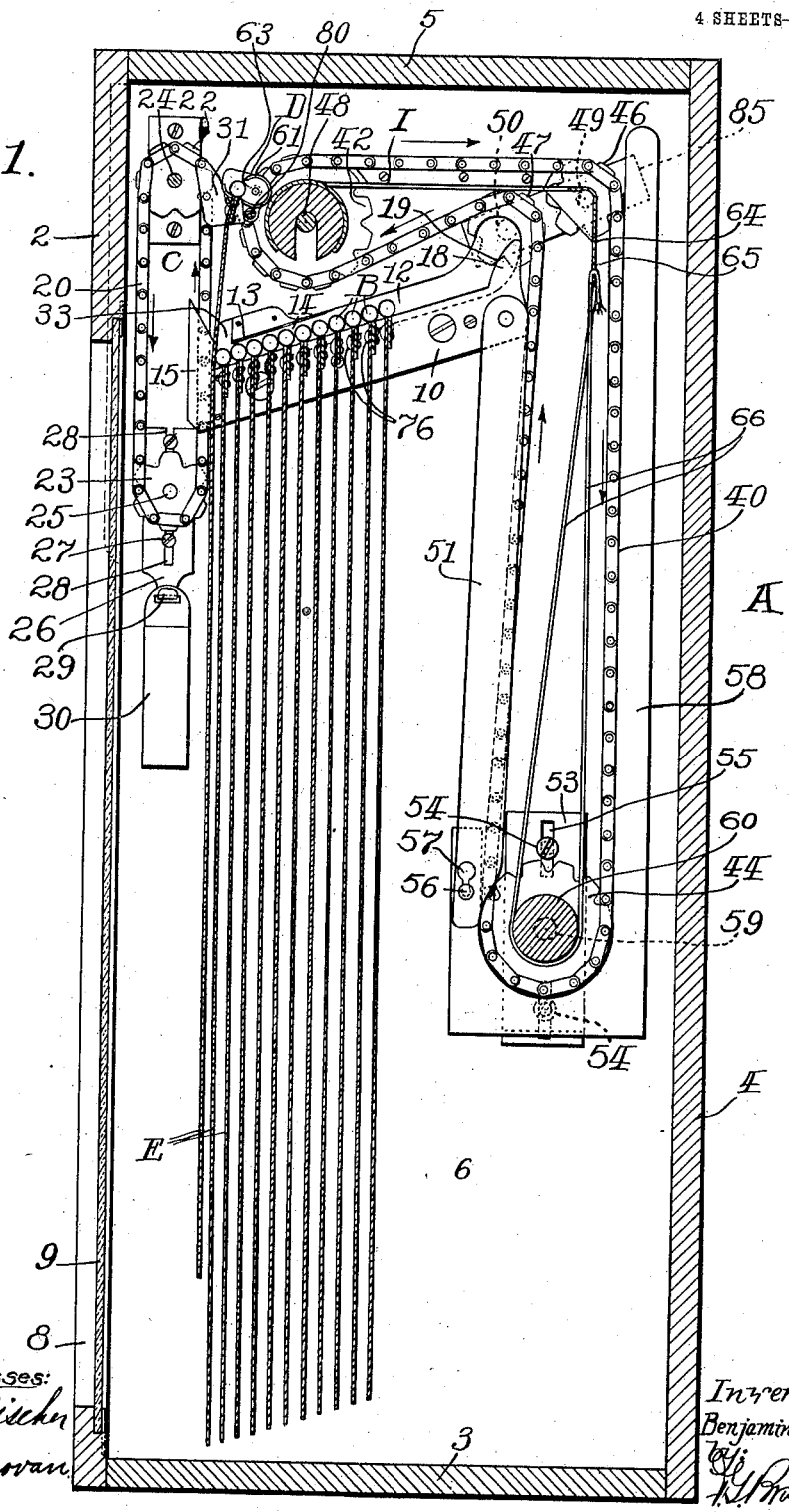
Figure 2:
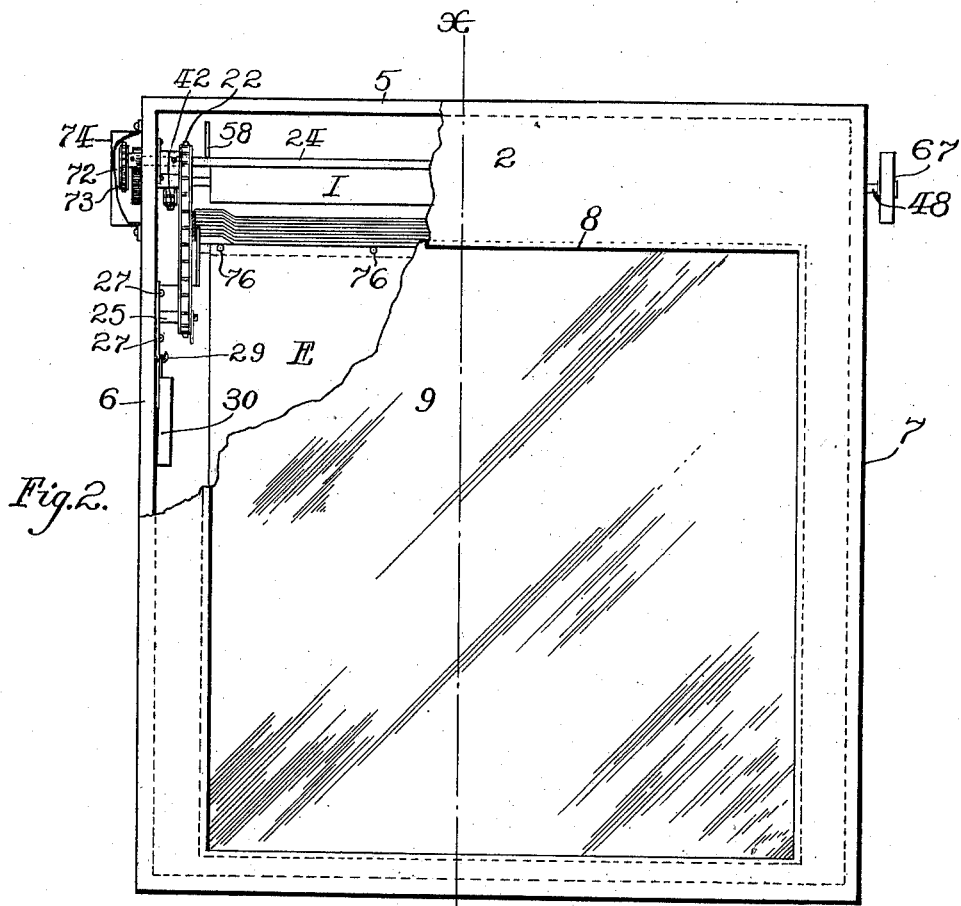
Figure 3:
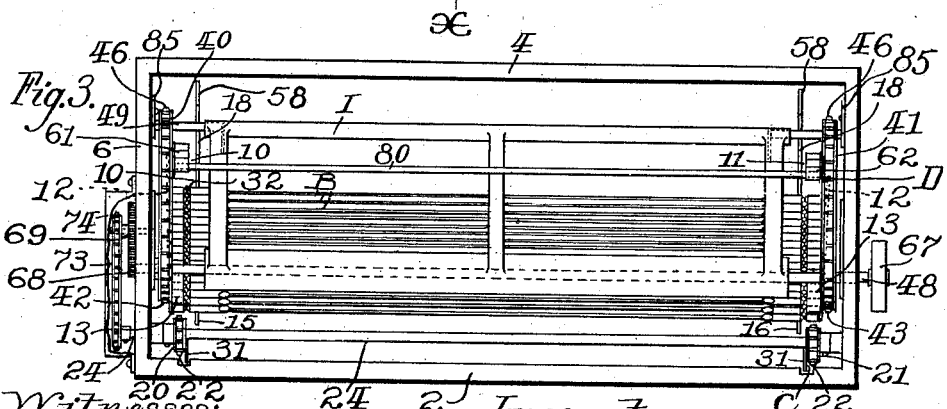
Figure 6:
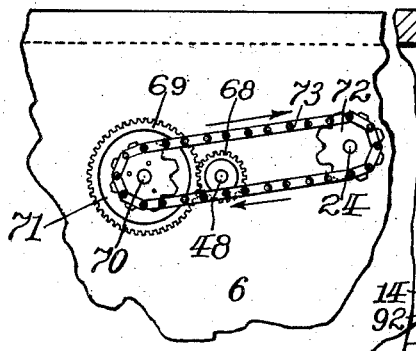
Figure 4:
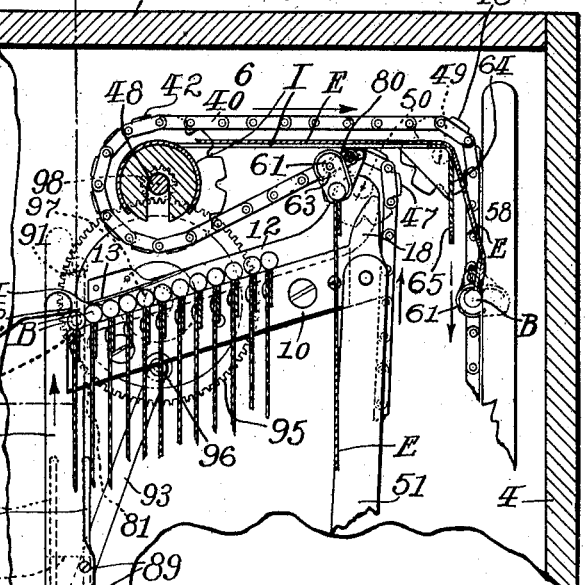
Figure 7:
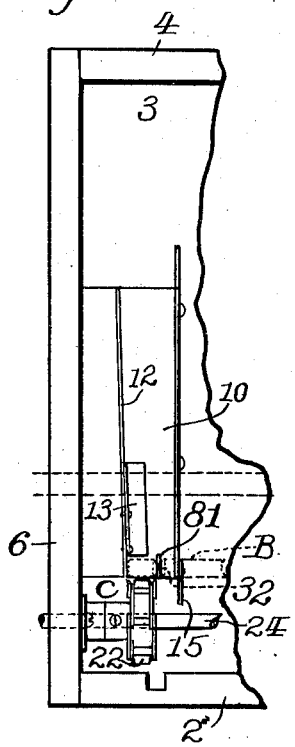
Figure 5:
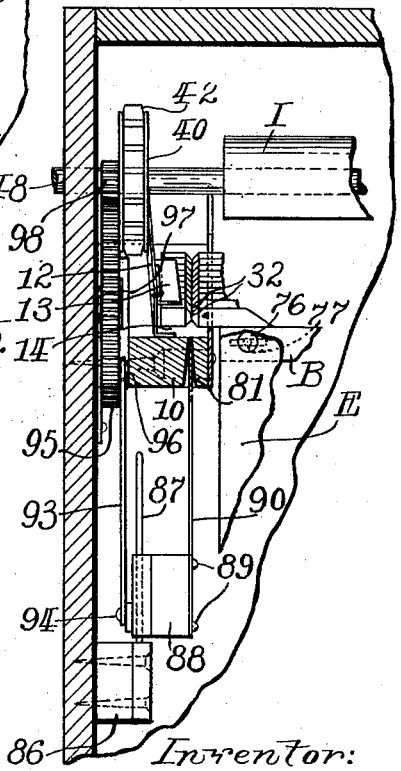

In the accompanying drawings forming part of this specification, Figure 1 is a vertical section in side elevation of my invention; Fig. 2 is a front elevation on a reduced scale from that illustrated in Fig. 1, part of the inclosing frame being broken away to expose part of the interior mechanism to view, the line upon which the section illustrated in Fig. 1 is taken being indicated by X—X; Fig. 3 is a plan view, the cover being removed and part of the inclosing frame over the driving gear broken away; Fig. 4 is a detail side sectional view similar to Fig. 1 illustrating an alternative construction; Fig. 5 is a front sectional view of a detail, the section being taken on the line Z—Z of Fig. 4; Fig. 6 is a side view of a detail showing part of the driving gear, the cover over the same being removed; Fig. 7 is a plan of a detail of my invention the cover of the frame being removed, and Fig. 8 is a back view, the back of the inclosing frame being removed.

In the drawings A represents an inclosing frame in the form of a hollow parallelopiped having a front 2, floor 3, back 4, top 5 and two sides 6 and 7. The front of the inclosing frame has an aperture 8 in which may be placed a pane of glass 9 through which the signs E are exposed successively or the rugs or other goods which are to be displayed are adapted to be displayed. It will be understood that the frame may be changed in construction to suit the requirements of the signs or goods to be displayed and that it is not necessary to have an aperture covered by glass as described. Upon the side walls are mounted two forwardly and downwardly inclining supports 10 and 11 which are formed with vertical flanges 12 adjacent to the side walls. The foremost ends of these supports have guards 13 secured to the flanges 12 so as to form forwardly declining channels 14. Adjoining the foremost ends of the supports are two vertical stops 15 and 16 which are in the form of plates.

The supports 10 and 11 are employed to hold a series of rods B which carry the signs to be displayed through the apertured front of the inclosing frame and the rods B are held from any greater lateral movement than the distance between the flanges 12. The distance between the flanges 12 at the rear of the supports 10 and 11 being greater than at the front of said supports keeps the rods B from binding at the rear of the supports 10 and 11 and as the supports 10 and 11 decline toward the aperture, said rods feed downwardly by gravity as fast as the rod in front with its sign is removed. (See Figs. 1, 3 and 7.) The stops 15 and 16 immediately adjacent to the foremost ends of the supports 10 and 11 are spaced from the lower ends of the guards 13 so as to leave an opening for the foremost rod to be lifted off of the supports. At the inner edges of the upper ends of the supports 10 and 11 is a pair of upwardly extending guide shoulders 18 having forwardly declining edges 19 which serve to prevent the rods B after they have been lifted from the foremost end of the series of rods on the supports and passed to the back end of the series, from slipping off of the supports by accident. The line of travel of each rod B from the front of the series or stack is first up, then back, then down, then up again and then down upon the upper ends of the supports. Thus a continuous series of exposures of the signs are made through the apertures. Each rod B is formed with an annular groove 32 near each end for the purposes to be hereinafter described and has attached thereto the sign E by split rivets 76 passing through perforations 77 in the sign and rod. The sign E while following the line of travel of the rod on which it is mounted rolls completely over, and in this manner greater economy of space is effected in the frame.

The means for causing the rods B and their signs E to follow the line of travel as indicated above consists of two coöperating carriers C and D. The carrier C is employed for lifting the rods off of the supports and the carrier D for carrying the rods back to the rear end of the series on the supports after each has been lifted. The carrier C consists of two vertical link belts or chains 20 and 21 located on opposite sides of the frame and traveling in the direction of the arrows illustrated in Fig. 1 over drive sprockets 22 and idle sprockets 23. The sprockets 22 are rigidly mounted upon a horizontal drive shaft 24 which extends across the inclosing frame, its ends being journaled in the sides 6 and 7. The idle sprockets 23 are freely journaled upon gudgeons 25 which are mounted upon plates 26. These plates are secured to the sides 6 and 7 by means of screws 27 passing through slots 28, this form of connection permitting the plates to slide vertically upon the sides. The lower ends of the plates are formed with hooks 29 to which are secured weights 30. These weights draw down upon the gudgeon supports and take up the slack of the link belts 20 and 21 as they travel in the frame. The links of the belts 20 and 21 have secured thereto flights 31, one flight being shown upon each of said belts and the two flights as shown being opposite each other and lifted upward by the innermost laps of the belts to engage the ends of the rods B in the grooves 32 and raise said rods off of said supports. Each rod B as it is raised by the carrier C toward the upper end of travel of the belts 20 and 21 is transferred on to an auxiliary carrier D, which will be hereinafter described. Previous to the flights 31 engaging the rods B they pass through guide openings 81 in the forward end of the supports 10 and 11 so that the flight 31 will always engage the rods B in the center of the grooves 32 thus raising the rods B in position so that they can be removed by the carrier D and insure perfect operation (see Figs. 1, 5 and 7). The distance between the stops 15 and 16 and the guards 13, produce passageways 33 through which only one rod at a time can be raised off of the supports. As many flights 31 may be placed upon the belts 20 and 21 as desired, the number being varied and positioned according to the time it is desired that each sign shall be exposed through the aperture in front of the inclosing frame.

The auxiliary carrier D consists of a pair of link belts 40 and 41 which are placed upon the sides of the inclosing frame, the belts 20 and 21 and 40 and 41 respectively traveling in adjacent parallel planes, the belts 40 and 41 being placed a little closer to the sides of the inclosing frame than the belts 20 and 21. The belts 40 and 41 travel over the pairs of sprockets 42 and 43 above the foremost ends of the supports 10 and 11 and thence horizontally toward the back of the inclosing frame and over the idle sprockets 46 then down and around the lower idle sprockets 44 and 45 then up and over the idle sprockets 47 which are located just above the rear ends of the supports 10 and 11 and then to the sprockets 42 and 43. The direction of travel of the belts 40 and 41 is indicated by the arrows in Fig. 1. The sprockets 42 and 43 are rigidly mounted upon the transverse power shaft 48, the ends of which are journaled in the sides of the frame. The idle sprockets 46 and 47 are respectively journaled upon gudgeons 49 and 50 which are secured to the side of the inclosing frame on plates 85. Depending from the inner ends of the supports 10 and 11 are hangers 51 and 52, each of which carries upon its lower end a block 53. These blocks are held upon the sides of the inclosing frame by screws 54 passing through vertical guide slots 55 in them. The connection between each block and its adjacent arm is by means of a rivet 56 through a vertical slot 57 which permits of sliding engagement between said hangers and blocks. The back edges of the blocks have upwardly projecting guard arms 58. The blocks 53 carry gudgeons 59 upon which are freely journaled the idle sprockets 44 and 45. The blocks act as weights to take up the slack of the belts 40 and 41. Said hangers 51 and arms 58 act as guards for the ends of the rods B to keep them in the flights 61 and 62 as the signs are carried to the rear of the supports 10 and 11. The shaft 59 has journaled thereon a carrier roller 60 which assists in causing each sheet to turn completely over when it is being moved by the belts 40 and 41.

The belts 40 and 41 support a pair of oppositely disposed flights 61 and 62 each of which is rigidly secured to one of the links on the inside and is formed with a pocket 63. The flights 61 and 62 are connected by a rod 80 which is loosely journaled in said flights directly under the pockets 63 and serves to steady the flights on the belts 40 and 41. These flights 61 and 62 engage the ends of the rods B when in raised position on the carrier C as illustrated in Fig. 1 and the speed and length of travel of the belts 40 and 41 being greater than the surface speed and travel of the belts 20 and 21 causes them to remove the rods from the flights 31 and carry them back in a horizontal direction, then downwardly over the path of travel indicated by the arrows in Fig. 1 of the belts 40 and 41. As the rods are raised on the inner laps of the belts 40 and 41 and carried over the idle sprockets 47, they drop out of the pockets 63 of the flights 61 and 62 as illustrated in Fig. 4 and fall upon the inner ends of the supports 10 and 11. The wall of each pocket 63 is curved up as illustrated in Fig. 1 to retain each rod while passing down the back of the machine and until the rod is deposited on the supports 11 and 12.

For the purpose of preventing the signs from coming into contact with the working parts of the device, a shield frame I is constructed over the shaft 48 and the gudgeons 49 and is formed with a depending flange 64 at its back to which is secured through perforations 65 a lace or cord 66 which is looped a number of times loosely over the idle roller 60 and secured in place.

The method of driving the apparatus may be by means of a pulley 67 mounted upon the shaft 48 or by any other suitable means desired. This pulley transmits motion to the shaft 48 from which it is communicated at suitable speed to the shaft 24 by means of intermeshing reduction gears 68 and 69, the former being mounted upon the outer end of the shaft 48 and the latter journaled upon a gudgeon 70 which is secured to the outer wall of the side 6. By varying the size of these gears 68 and 69, the time of the exposure of the sign can be changed. The gear 69 has connected thereto a sprocket 71 and the shaft 24 has another sprocket upon its end 72. Over these sprockets 71 and 72 a chain 73 is passed by which motion is communicated between said parts. A cover 74 may be placed over the gearing on the outside of the inclosing frame to protect the parts from dust and danger.

In operation the rods B which hold the signs or objects to be successively displayed through the aperture of the frame are picked up one at a time by the flights 31 on the carrier C and lifted into the position illustrated in Fig. 1. The operation of the carrier D is timed so that the flights 61 and 62 which it carries, shift the rod which has been lifted off of the flights 31 and moves it toward the rear of the inclosing frame. The rod so removed travels with the carrier D down at the back of the frame and then up and over the inner ends of the supports 10 and 11. As the flights 61 move into the position illustrated in Fig. 4 the rod falls out of the pockets or receptacles 63 on to the supports 10 and 11 and slide down into place at the rear end of the series of rods which are carried upon said supports. While each rod makes the circuit as just described the sign which is carried by it trails over the guard I and, turns completely around the idle roller 60. The flights 31 on the carrier C engage the rods in the grooves 32 said grooves permitting the flights to positively engage only one rod at a time and causing the flights to hold the rod engaged without moving out of place laterally. In Figs. 4 and 5 an alternative construction of the carrier C is illustrated. Secured to the sides 6 and 7 of the frame are blocks 86 which carry vertical rods 87 upon which slide vertically the blocks 88. Rigidly secured to the blocks 88 by screws 89 are vertical lifting plates 90 which are formed with recesses 91 and shoulders or stops 92 at their upper ends. The stops 92 take the place of the stops 15 and 16 in the previous construction. The lifting plates 90 are raised and lowered by connecting bars 93 one end of which is secured to the blocks 88 by screws 94 and the other end to gears 95 by screws 96. The gears 95 are journaled upon gudgeons 97 which are secured to the inner walls of the sides 6 and 7, said gears 95 being driven by smaller gears 98 which are rigidly mounted upon the transverse power shaft 48. Normally the plates 90 are positioned in the guide openings 81 so that the stops 92 hold the rods B from sliding off of the front of supports 10 and 11. Thus in operation the plates 90 are raised by the connecting bars 93 and gears 95 and 98, the recesses 91 engaging the rods B in the grooves 32, raising said rods off of the front of supports 10 and 11, when said rods are removed from the recesses 91 by the carrier D which transfers said rods to the rear of supports 10 and 11, in the same manner as previously described. It should be borne in mind that the mechanism on the sides 6 and 7 is precisely the same.

The apparatus above set forth is positive in action and is adapted to display a sign nearly as large as the inclosing frame holding it while with prior devices the frame must necessarily be much larger than the sign or object displayed.

Where the term sign is used throughout the above specification and following claims, I mean it to include any object that is manipulated by the mechanism described to make successive exposures thereof through the aperture in the frame for advertising or other purposes.

Where the term flight or flights is employed in the following claims, I mean it to include any equivalent means for engaging and lifting the rods carrying the signs.

In accordance with the patent statutes I have described the principles of operation of my invention together with the apparatus which I now consider to represent the best embodiment thereof but I desire to have it understood that the construction shown is only illustrative and that the invention can be carried out by other means and applied to uses other than those above set forth within the scope of the following claims.

Having described my invention, what I claim as new and desire to protect by Letters Patent is:—

1. Display apparatus, comprising, in combination, a supporting frame having two sides, a pair of forwardly declining supports between said sides, a series of rods resting upon said supports, each carrying a depending flexible sign, a chain carrier adapted to pick up the foremost rod of said series, an auxiliary chain carrier traveling at a higher rate of speed and intersecting the path of said first carrier and adapted to lift a rod from said first carrier and deposit it at the back of said series of rods on said supports, and means coöperating with said auxiliary carrier for turning said sign, whereby the sign which is turned is deposited with its rod at the back of said series of rods and with its same display surface facing outwardly.

2. Display apparatus, comprising, in combination, a supporting frame, a pair of forwardly declining supports carried by said frame, a series of rods resting with their ends upon said supports each of said rods carrying a depending flexible sign, a pair of belts disposed on opposite sides of said frame and adapted to lift the foremost rod of said series off of said supports, a second pair of belts disposed on opposite sides of said frame and traveling at a higher rate of speed than said first pair, said second pair having flights adapted to engage and lift each rod from near the upper end of said first pair of belts and carry it back and deposit it at the back of said series of rods, leaving its sign depending, means coöperating with said second pair of belts for turning the signs as they are carried back leaving their same display surfaces facing forwardly and means for actuating all of said belts.

3. Display apparatus, comprising, in combination, a supporting frame having an apertured front, a pair of forwardly declining supports between the sides of said frame, a series of rods resting upon said supports each carrying a depending flexible sign, the foremost sign registering with the aperture in said front, a link belt carrier adapted to pick up the foremost rod of said series, an auxiliary link belt carrier timed to remove the rod which is lifted from the first carrier, a guard adjacent to said auxiliary carrier and actuating mechanism for operating said carriers, said auxiliary carrier being adapted to convey the rod and draw the sign which it carries over said guard and turn said sign completely over and deposit the said rod at the back end of said series with the sign which it carries depending therefrom with its same surface facing outwardly.

4. Display apparatus, comprising, in combination, a supporting frame having two sides and an apertured front, a pair of forwardly declining supports upon said sides, a series of rods having their ends resting upon said supports and adapted to move down the same, each rod carrying a depending flexible sign, the foremost sign registering with the aperture in said front, a carrier mounted upon said sides to engage the ends of the foremost rod of said series and raise said rod, an auxiliary carrier mounted upon said sides and adapted to engage the ends of the rod which is lifted to remove the rod from the first carrier and deposit the same at the back end of said series of rods on said supports, a guard over which the sign on the rod which is carried by the auxiliary carrier is turned, and actuating mechanism for driving said carriers.

5. Display apparatus, comprising, in combination, a supporting frame, forwardly declining supports mounted upon said frame, a flexible sign having gudgeons near its upper corners adapted to rest upon said supports, a lifting carrier having flights adapted to engage said gudgeons and lift them with said sign, and an auxiliary carrier traveling at a higher rate of speed than said lifting carrier and in the path of said flights and adapted to engage said gudgeons while on said flights, turn the sign over and deposit it with said gudgeons upon said supports.

6. Display apparatus, comprising, in combination, a supporting frame, forwardly declining supports mounted upon said frame, a series of rods each having ends resting upon said supports and carrying a depending sign, each rod having annular channels near its ends, a carrier having flights adapted to engage the foremost rod of said series in its channels, an auxiliary carrier adapted to remove each rod which is lifted from the first carrier, turn the sign over which it carries and deposit the rod at the back end of said series upon said supports, and actuating mechanism for operating said carriers.

7. Display apparatus, comprising, in combination, a supporting frame, a forwardly declining support mounted upon said frame, a series of sign supports resting upon said declining support, a carrier adapted to pick up the foremost sign support of said series, an auxiliary carrier timed to remove each sign support which is lifted from the first carrier, traveling at a higher speed than said first carrier and adapted to carry said sign support down the back of the machine, then up and deposit the same at the back end of said series of sign supports on said declining support, and actuating mechanism for operating said carriers.

In testimony whereof, I have signed my name to this specification, in the presence of two subscribing witnesses.

BENJAMIN B. BIENHOFF.

Witnesses:
H. L. FISCHER,
JULE DONOVAN.